Sept. 23, 1969  T. J. O'CONNOR  3,469,058
MACHINE TOOL FOR ELECTRICAL EROSION MACHINING
Filed June 13, 1966  2 Sheets-Sheet 1
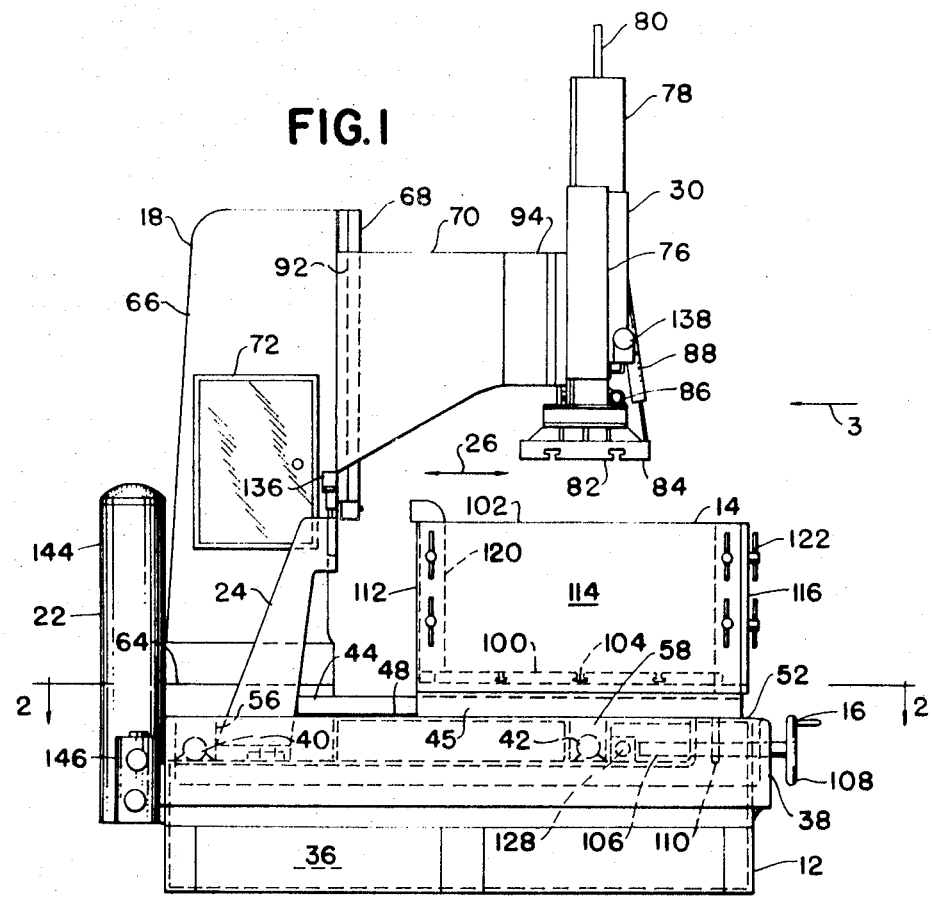
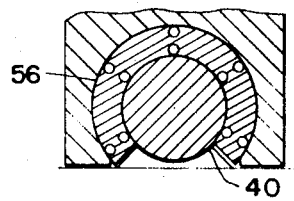
FIG.4
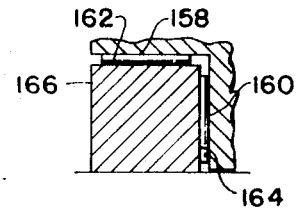
FIG.5
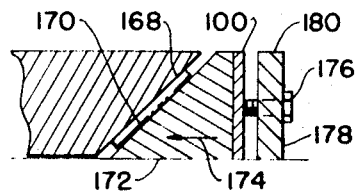
FIG.6
INVENTOR.
THOMAS J. O'CONNOR
BY *Whittemore Hulbert*
*& Belknap*
ATTORNEYS Sept. 23, 1969 T. J. O'CONNOR 3,469,058
MACHINE TOOL FOR ELECTRICAL EROSION MACHINING
Filed June 13, 1966 2 Sheets-Sheet 2

INVENTOR.
THOMAS J. O'CONNOR
BY
ATTORNEYS

United States Patent Office 3,469,058
Patented Sept. 23, 1969

3,469,058
MACHINE TOOL FOR ELECTRICAL
EROSION MACHINING
Thomas J. O'Connor, 100 Morgan Road,
Ann Arbor, Mich. 48104
Filed June 13, 1966, Ser. No. 556,931
Int. Cl. F16c 29/04; B23p 1/02
U.S. Cl. 219—69          10 Claims

ABSTRACT OF THE DISCLOSURE

The machine tool disclosed includes a base, a work tank supported on the base for sliding movement in one direction, machining head structure supported on the base for sliding movement in a direction at right angles to the one direction including a column base, a column extending upwardly from said base at one end thereof, a slide depending from said column extending over the tank structure and separately movable ram structure depending from said slide. The work tank and machining head structure are supported on cylindrical bearings at the opposite ends thereof in one modification and in another modification are disclosed supported on a rectangular bearing at one end and an inclined adjustable bearing at the other end. Separate spacer members may be inserted between the column base and column and the slide and ram of the machining head structure to vary the dimensions thereof and a tilt-up platen is provided on the separately movable ram structure to provide ready access to an electrode carried thereby.

Electrical discharge machining apparatus generally includes a separate machine tool, a power supply for supplying machining power to the machine tool and a servo mechanism for maintaining a gap between an electrode carried by the machine tool and a workpiece. The operation of and cooperation between the machine tool, power supply and servo mechanism is well known and is, for example, set forth in United States Patents Nos. 3,167,632 and 3,222,494 and the publication referred to therein. The present invention is concerned with a machine tool for use in conjunction with an electrical discharge machine power supply and servo mechanism or the like.

In the past machine tools for electrical discharge machining and the like have been deficient in that the work tank has been small, thus limiting the size of work accommodated by the machine tool and the worktable has been needlessly long to provide required complete movement of the work tank beneath the ram of the machine tool. In addition prior machine tools for electrical discharge machining or the like have been subject to undesired deflections in use, limited vertical movement of electrodes carried thereby, and due to the ram structure thereof, the inspection and positioning of electrodes thereon has been more difficult than necessary.

It is therefore one of the objects of the present invention to provide an improved machine tool for electrical discharge machining or the like.

Another object of the invention is to provide a machine tool for electrical discharge machining or the like including a base, a work supporting structure and machining head structure positioned on said base and means for moving both the work supporting structure and the machining head structure relative to the base and at right angles to each other.

Another object of the invention is to provide a machine tool as set forth above wherein the machining head structure includes separately movable slide and ram structure.

Another object of the invention is to provide a machine tool as set forth above wherein the machining head structure includes an elongated column base supported at each end, a column extending upwardly from one end of said column base, a slide secured to and extending outwardly from said column, a ram secured to said slide and spacing members between said column base and column and said slide and ram.

Another object of the invention is to provide an inclined bearing surface for said column base at at least one end thereof and means for adjusting said inclined bearing surface toward the other end of said column base.

Another object is to provide a machine tool as set forth above including a flip-up platen carried by the ram.

Another object is to provide a machine tool as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a side elevation view of a machine tool for electrical discharge machining or the like constructed in accordance with the invention.

FIGURE 4 is an enlarged partial section view of the machine tool illustrated in FIGURES 1 through 3 taken substantially on the line 4—4 in FIGURE 2.

FIGURES 5 and 6 are section views similar to that of FIGURE 4 illustrating a modification of the bearing structure for the work supporting structure and the machining head structure of the machine tool illustrated in FIGURES 1 through 3.

Figure 2:
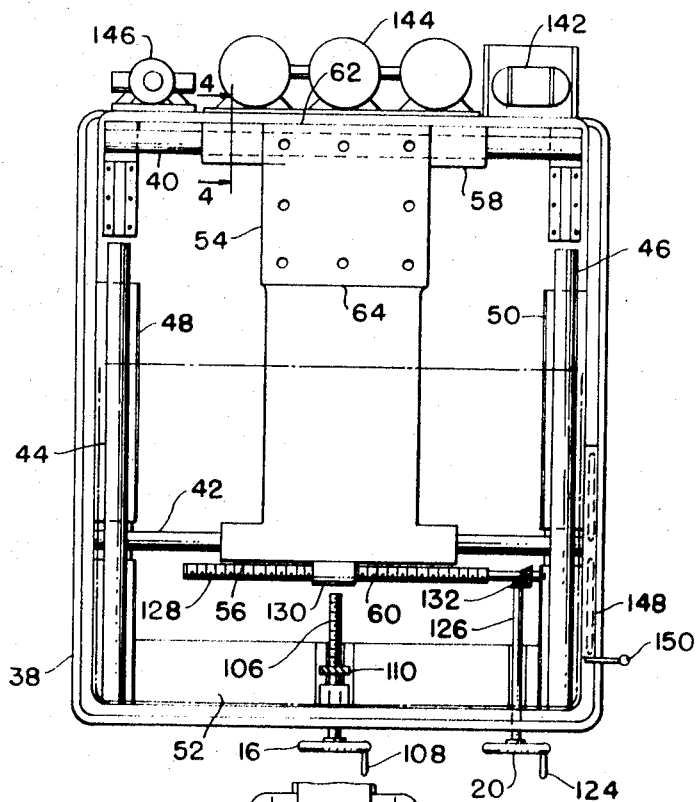
FIGURE 2 is a section view of the machine tool illustrated in FIGURE 1 taken substantially on the line 2—2 in FIGURE 1.

With particular reference to the figures of the drawings one embodiment of the present invention will now be disclosed in detail.

As shown best in FIGURE 1, the machine tool 10 includes the base 12 supporting the work supporting structure 14 for movement thereon and mechanism 16 for moving the work supporting structure 14 on the base 12. Machine tool 10 further includes the machining head structure 18 mounted on the base 12 for movement with respect thereto and the mechanism 20 for movement thereof. A dielectric system 22 and a position indicating system 24 are also included in the machine tool 10.

In operation the work supporting structure 14 is moved in the direction of arrows 26 and the machining head structure 18 is moved in the direction of arrows 28 to position an electrode (not shown) held by the ram structure 30 of the machining tool head structure 18 with respect to a workpiece (not shown) secured on the work supporting structure 14. Dielectric is maintained in the work tank 102 of the work supporting structure 14 as required by the dielectric system 22 and the positions of the machining head structure 18, work supporting structure 14 and ram 78 of ram structure 30 are indicated by the position indicating system 24.

More specifically, the base 12 is a generally rectangular member which is hollow and which is divided centrally by the partition 32 to provide storage tanks 34 and 36 for unfiltered and filtered dielectric oil, respectively. An apron flange 38 is provided around the outside of the base 12 at the top thereof to collect any dielectric oil that might spill or leak from the work tank 102.

Base 12 supports the bearing shafts 40 and 42 on which the machining head structure 18 is supported for movement in the direction of arrows 28. The bearing shafts 44 and 46 on which the work supporting structure 14 is mounted for movement in the directions of arrows 26 are also carried by the base 12 on the upwardly extending portions 48 and 50 respectively at the opposite sides thereof. The means 16 and the means 20 for moving the work supporting structure 14 and the machining head structure 18 extend through a similar upwardly extending portion 52 of the base 12 at the front thereof and are carried thereby.

The machining head structure 18 includes an elongated column base 54 best shown in FIGURE 2, having split ball bearing slides 56 and 58 connected thereto at the ends 60 and 62, respectively. The slides 56 and 58 cooperate with the bearing shafts 40 and 42 to permit movement of the column base 54 in the directions of arrows 28 and provide an extremely broad base transversely of the head structure 18 to prevent undesired movement thereof, such as deflection, cocking and the like, in use. The extent of the column base 54 between the shafts 40 and 42 provides a particularly large base for the head structure 18 in a direction perpendicular to the shafts 40 and 42, whereby the column base 54 is extremely stable in all directions.

A raised portion 64 is provided at end 62 of the column base 54 to which the column 66 of the head structure 18 is secured by means of bolts or the like. A spacer block (not shown) may be provided between the raised portion 64 of the column base 54 and the column 66 if desired to give added height to a standard column.

As shown best in FIGURE 1, column 66 includes a guide 68 at the front of the upper end thereof for supporting the slide 70 in a vertically adjusted position over the work supporting structure 14. An electrical box 72 may be secured to the column 66 in which the usual electrical components of a servo mechanism and limiting circuits may be located if desired. Structure is provided in conjunction with the wheel 74 operable between the column 66 and slide 70 for moving the slide vertically with respect to the column 66. Such structure may, for example, be a simple rack and pinion with the pinion rotatably secured in the column 66 and connected to the wheel 74 and the rack connected to the slide 70. The operating mechanism for the slide 70 may of course be power actuated and be hydraulic instead of mechanical if desired.

The slide 70, as best shown in FIGURE 1, is a horizontal extension of the column 66 having a recess at one end 92 thereof for receiving the guide portion 68 of the column 66 and including means at the other end 94 for securing the ram structure 30 thereto. A spacer block (not shown) may be provided between the slide 70 and ram structure 30 to position the ram structure 30 in different horizontal relations with respect to the work supporting structure 14.

The ram structure 30 includes the vertical guide 76, ram 78 slidably mounted in the guide 76, hydraulic structure 80 for moving the ram 78 vertically with respect to the guide 76, and the platen structure 82.

Platen structure 82 includes the platen 84 to which electrodes for electrical discharge machining may be secured, pivot means 86 by which the platen 84 is pivotally secured to the ram 78 and the hydraulic piston and cylinder structure 88 for tilting the platen 84 approximately ninety degrees and the platen locking structure 90. Thus in operation the platen locking structure 90 may be loosened and the piston and cylinder structure 88 actuated to pivot the platen 84 about the pivot 86 substantially ninety degrees whereby an electrode secured to the platen 84 may be brought into a position for inspection from the front of the machine tool 10.

The mechanism 20 for moving the machining head structure 18 in the direction of arrows 28 includes the hand wheel 124, the shaft 126 mounted for rotation in the base 12 and secured to the hand wheel 124 for rotation therewith, the screw 128 secured for rotation to the base 12, and the nut 130 rigidly connected to the column base 54. Bevel gears 132 are provided for rotating the screw 128 on rotation of the hand wheel 124.

Thus, in operation, when the hand wheel 124 is rotated, the screw 128 is rotated through the bevel gears 132. The nut 130 is thus moved axially of the screw 128 to position the machining head structure 18 transversely of the base 12 at right angles to the direction of movement of the tank 102.

The work supporting structure 14 includes the worktable 100 and the work tank 102. The worktable 100 includes the split, recirculating roller bearings 45 and 47 secured to the opposite edges thereof and engaged with bearing shafts 44 and 46 for guiding the movement of the work supporting structure 14 in the direction of arrrows 26. Worktable 100 includes the slots 104 therein extending at right angles thereto for tying down a workpiece positioned thereon in a predetermined position relative thereto.

The mechanism 16 for moving the work supporting structure 14 in the direction of arrows 26 includes the screw 106 which is rotatable by means of the handwheel 108 and the nut 110. The screw 106 is secured for rotation in the base 12, while the nut 110 is connected to the front of the worktable 100 and is threaded on the screw 106. On rotation of the hand wheel 108, forward and backward sliding of the work supporting structure 14 on the bearing shafts 44 and 46 is accomplished.

The work tank 102 includes the stationary back side 112, the three removable sides 114, 116 and 118 and the vertical corner members 120 at each of the four corners thereof. Screw-down handles 122 are provided for securing the removable sides 114, 116 and 118 to the corner members of the tank 102. Sealing means is provided between the removable covers and the corner members. Thus, any of the three sides 114, 116 and 118 of the tank 102 may be removed to permit placing of work in the tank or removal of the work therefrom in the most convenient manner for the particular work.

The position indicating system 24 includes travel gages 136, 138 and 140. The gage 136 is provided in conjunction with bar 137 and supports 139 to give a reading of the relative position of the machining head structure 18 relative to the base 12. Gage 138 provides an indication of the relative position of the ram 78 and guide 76 of the ram structure 30, while the gage 140 visually indicates the relative position of the work supporting structure 14 and the base 12. Indicating apparatus other than the travel gages may be used to provide similar indications, such as the optics often found on electrical discharge machining apparatus and well known in the industry.

The dielectric system 22 includes the storage tanks 34 and 36, pump 142, filters 144 and pump 146. In operation, a rotatable sleeve valve 148 operated by lever 150 is operable to dump the dielectric from the work tank 102 through the passage 152 into the storage tank 34. The used dielectric in storage tank 34 is subsequently pumped from tank 34 by pump 142 and through filters 144 and into the storage tank 36 for clean dielectric. The clean dielectric from tank 36 is pumped by means of pump 146 back into the work tank 102 as needed. The specific hydraulic connections for the dielectric flow indicated have not been shown in the drawings in the interest of clarity but will be readily understood from the above circuit flow disclosure.

Thus, in overall operation of the machine tool 10, as a part of electrical discharge machining apparatus, a workpiece (not shown) is secured to the worktable 100 of the work supporting structure 14. The tilt-up platen 84 is pivoted so that the face 85 thereof is perpendicular and toward the front of the machine tool 10, whereby an electrode with which it is desired to machine the workpiece (not shown) may be easily secured to the platen. The platen is then pivoted back into the working position thereof and locked in place, as shown in FIGURES 1 and 2. The machining head structure 18 is then moved in the direction of arrows 28 and the work supporting structure 14 is moved in the direction of arrows 26 to accurately position the electrode over the workpiece. The sides of the tank 102 are secured in place and clean dielectric from the storage tank 36 is pumped into the tank 102 by means of the pump 146 to cover the workpiece with dielectric. The electrode is then moved down by means of the usual servo drive in conjunction with the ram 78 or may be initially moved down close to the workpiece by means of movement of the slide 70.

After the workpiece has been machined, the dielectric fluid is drained from the tank 102 through the valve 148 into the storage tank 34 from which it is pumped through the filters by pump 142 and back into the clean dielectric tank 36. During machining of the workpiece, should it become necessary to inspect the electrode or change the electrode, the platen 84 may be raised with ram 78 and pivoted into its vertical position to make the inspection of the electrode and any necessary changing thereof as easy as possible.

Also, during the machining of the workpiece, it will be noted that air is permitted to circulate beneath the work supporting structure 14 due to the particular construction of the base 48 and movement thereof whereby the machine tool 10 is particularly cool running.

Figure 3:
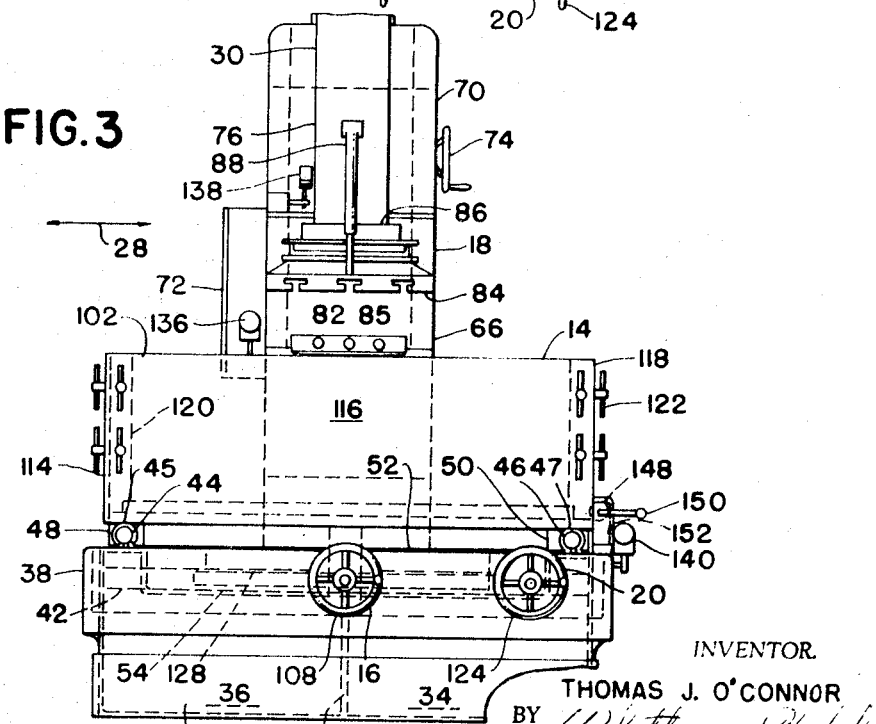
FIGURE 3 is a partial front view of the machine tool illustrated in FIGURE 1 taken in the direction of arrow 3 in FIGURE 1.

While the bearing structures, as shown in FIGURES 1 through 3 and in more detail in the section view of FIGURE 4, include bearing shafts 40, 42, 44 and 46 and split roller bearings 56, 58, 45 and 47, the bearing structures may be as shown in FIGURES 5 and 6. The bearing structures of FIGURES 5 and 6 include roller bearings 158 and 160 engaged with the bearing surfaces 162 and 164 on bearing blocks 166, as shown in FIGURE 5, which may be positioned at one side of the worktable 100 and at the column end of the column base. Roller bearings 168 at the other end of the column base operate in conjunction with the inclined bearing surface 170 on the bearing block 172, as shown in FIGURE 6. A similar inclined bearing block and roller bearings may be positioned at the other side of the worktable 100. The inclined surface 170 and bearing block 172 may be positioned in the direction of arrows 174 by means of adjusting bolts 176 operable between the fixed abutment 178 in which they are threaded and the bearing block 180 against which they press.

In operation the bearing structure of FIGURES 5 and 6 has been proved to increase the cutting efficiency of the machine tool 10. The reason for the improved efficiency is not fully known. However, it is suggested that vibrating or pulsating movement of the head structure 18 is prevented by permitting the end of the base 48 to move up and down the inclined surface 170. Levelling of the machining head structure 18 and the work supporting structure 14 is facilitated by the bearing structure of FIGURES 5 and 6 since tilting of these structures is accomplished on adjustment of the bearing blocks 172 toward or away from the bearings 168.

It will thus be seen that in accordance with the invention there is provided a machine tool 10 for electrical discharge machining apparatus or the like which is particularly compact and which provides exceptional head movement relative to the worktable in all directions in a very small space. For example, in previous machines for the same relative head movement tables having substantially twice the length of the present table have been required. Also, applicant's design permits free flow of air beneath the work tank and worktable so that heat is rapidly dissipated and both cutting efficiency and levelling of the machine tool 10 is facilitated due to particular bearing structures provided therefor.

While one embodiment of the present invention and a modification thereof have been disclosed in detail, other embodiments and modifications are contemplated. For example, the machine tool of the invention may be modified for use as a cutting tool of, for example, the electrochemical type and the storage tanks 34 and 36 may be provided in a separate unit to which the used dielectric fluid is pumped and from which the clean dielectric fluid is fed. It is the intention to include all embodiments and modifications of the invention as are defined by the appended claims within the scope of the invention.

What I claim as my invention is:

1. A machine tool for electrical discharge machining or the like comprising a base, work supporting structure positioned on said base, machining head structure also positioned on said base and extending over said work supporting structure and separate means for moving both said work supporting structure and machining head structure relative to said base perpendicularly to each other horizontally, at least one of which includes bearing means at one end thereof which is rectangular in cross section and extends transversely of the base with bearings on the top and side thereof toward the other end thereof and bearing means at the other end thereof including a bearing surface inclined downwardly toward the one end thereof and bearings engaging the inclined bearing surface.

2. Structure as set forth in claim 1 wherein said machining head structure includes an elongated column base and a column supported on the one end of the column base and the other end of the column base extends beneath the work supporting structure with the bearing means secured to the opposite ends of the column base for movement of the column base transverse to the longitudinal extent thereof.

3. Structure as set forth in claim 1 and further including a spacing member positioned against the bearing means having the inclined surface and an adjusting screw secured to the base for adjusting the position of the inclined bearing surface.

4. A machine tool for electrical discharge machining or the like comprising a base, work supporting structure positioned on the base, machining head structure also positioned on said base and extending over said work supporting structure and separate means for supporting both of the work supporting structure and machining head structure for movement relative to each other and to the base in a horizontal plane, at least one of which includes spaced apart bearing means, one of which is rectangular and the other of which is inclined toward the rectangular bearing means.

5. Structure as set forth in claim 4 and further including means for adjusting the inclined bearing means toward and away from the rectangular bearing means.

6. Structure as set forth in claim 4 wherein the machining head structure includes a column base, at least one spacing block positioned on the column base and a column supported on the spacing block.

7. Structure as set forth in claim 4 wherein the work supporting structure includes a column and a slide positioned on said column for separate movement vertically thereof with respect to the work supporting structure.

8. Structure as set forth in claim 7 wherein the work supporting structure further includes a ram supported on the slide for separate movement relative thereto in the direction of movement of the slide relative to the column.

9. Structure as set forth in claim 8 and further including at least one spacer block positioned between the slide and ram.

10. Structure as set forth in claim 8 and further including a platen pivotally secured to the ram for pivoting between a horizontal and vertical position to facilitate ready inspection of an electrode secured thereto.

References Cited

UNITED STATES PATENTS

| | | | |
|---|---|---|---|
| 2,248,057 | 7/1941 | Bond | 219—69 X |
| 3,200,231 | 8/1965 | Bejat. | |
| 3,217,131 | 11/1965 | Brettrager. | |

JOSEPH V. TRUHE, Primary Examiner

R. F. STAUBLY, Assistant Examiner

U.S. Cl. X.R.

308—3, 6